(12) United States Patent
Joshi et al.

(10) Patent No.: US 7,401,469 B2
(45) Date of Patent: Jul. 22, 2008

(54) SYSTEM AND METHOD FOR PRESERVING FOOD

(75) Inventors: Anand Ganesh Joshi, Bangalore (IN); Mark Wayne Wilson, Simpsonville, KY (US); Sheena Leigh Ritchie, Louisville, KY (US)

(73) Assignee: General Electric Company, Niskayuna, NY (US)

( * ) Notice: Subject to any disclaimer, the term of this patent is extended or adjusted under 35 U.S.C. 154(b) by 597 days.

(21) Appl. No.: 11/017,609

(22) Filed: Dec. 20, 2004

(65) Prior Publication Data

US 2006/0130498 A1    Jun. 22, 2006

(51) Int. Cl.
*F25B 49/00* (2006.01)
*F25D 17/04* (2006.01)
*F25D 25/02* (2006.01)

(52) U.S. Cl. ............... 62/127; 62/176.1; 236/91 C

(58) Field of Classification Search ............... 62/127, 62/176.1, 264, 78; 236/91 C
See application file for complete search history.

(56) References Cited

U.S. PATENT DOCUMENTS 4,829,774 A * 5/1989 Wassibauer et al. ............ 62/78
5,445,798 A    8/1995 Ikeda et al.
5,911,957 A    6/1999 Khatchatrian et al.
5,946,919 A * 9/1999 McKinney et al. ............ 62/3.7
6,010,727 A    1/2000 Rosenthal
6,607,672 B2   8/2003 Koslow et al.
2004/0007000 A1* 1/2004 Takeda et al. ................ 62/78

FOREIGN PATENT DOCUMENTS

JP    10225262 A  *  8/1998
WO   WO00/57703      10/2000

* cited by examiner

*Primary Examiner*—Chen-Wen Jiang
(74) *Attorney, Agent, or Firm*—Paul J. DiConza

(57) ABSTRACT

System and method for preserving food. Embodiments of the system include a food compartment to store food and a user interface configured to receive user input relating to the preservation of the food stored. The system also includes a humidity sensor configured to sense a humidity level, an ozone generator configured to generate ozone gas, an ozone sensor configured to sense an ozone level and a gas sensor configured to sense a level of residual gases inside the food compartment. The system further includes a controller, responsive to the user interface, the humidity sensor, the ozone sensor and the gas sensor. In one embodiment, the controller preserves the food stored in the food compartment as a function of the user input, the humidity level, the ozone level, the residual gas level and as a function of a type of the food stored in the food compartment.

23 Claims, 3 Drawing Sheets

SYSTEM AND METHOD FOR PRESERVING FOOD

BACKGROUND

The present invention relates generally to the preservation of food items, and more particularly to a system and method for retaining freshness of perishable food items.

Retaining the freshness of food stored in a refrigerator has been a long-standing desire of consumers. The refrigerators or food preservation systems commonly available typically do not retain the taste, flavor or freshness of food when it is stored over a long period of time. One cause of this may be the way current systems control the operating conditions inside such systems. For instance, refrigerator storage compartments are typically set to maintain a temperature that lies in the range of 32-44 deg F. regardless of the food items stored in the compartments or the lengths of time the food items are to be stored.

Another issue with current food preservation systems is the lack of control over the loss of water from the stored food due to exposure to cold or humid air. For example, it is a general observation that green beans or leafy vegetables like lettuce can loose water up to 35% of original weight within three weeks of storage in a normal refrigerator pan. Although raising the humidity level around the stored food may help retain food freshness, bacteria and fungus that can spoil food grow faster in such humid environments.

Although growth of the bacteria and fungus may be controlled by exposing the food to germicidal or bactericidal environments, over-exposure of the food to these environments can cause some delicate vegetables like lettuce and cabbage to show surface pitting/browning.

Thus, there is need of a food preservation system that better retains the freshness of the food.

BRIEF DESCRIPTION

Briefly, in accordance with one embodiment of the invention, there is provided a refrigerator system. The system includes a food compartment to store food and a user interface configured to receive user input relating to the preservation of the food stored. The system also includes a humidity sensor configured to sense a humidity level, an ozone generator configured to generate ozone gas, an ozone sensor configured to sense an ozone level and a gas sensor configured to sense a level of residual gases inside the food compartment. The system further includes a controller, responsive to the user interface, the humidity sensor, the ozone sensor and the gas sensor. The controller preserves the food stored in the food compartment as a function of the user input, the humidity level, the ozone level, the residual gas level and as a function of a type of the food stored in the food compartment.

In accordance with another embodiment of the invention, there is provided a method for preserving food in a food compartment. The method includes receiving a user-supplied input that relates to preservation of the food in the food compartment, supplying ozone to the food compartment, generating moisture inside the food compartment. The method also includes determining a humidity level inside the food compartment, determining an ozone level inside the food compartment, determining a level of residual gases inside the food compartment. The method further includes controlling the preservation of the food in the food compartment as a function of the user supplied input and the sensed humidity level, the ozone level, residual gas level and as a function of a type of the food stored in the compartment.

DRAWINGS

DETAILED DESCRIPTION

Figure 1:
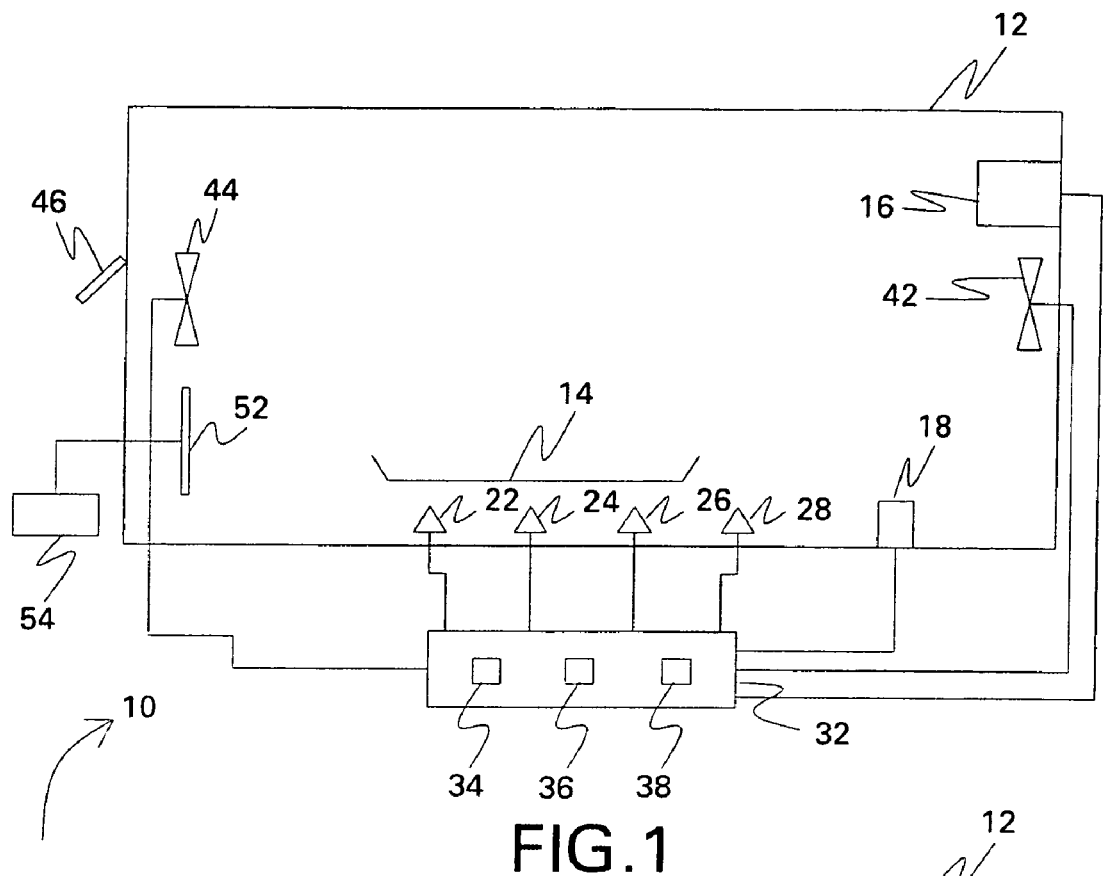
FIG. 1 is a block diagram of a food preservation system constructed in accordance with an exemplary embodiment of the invention.

FIG. 1 is a schematic diagram of an exemplary system 10 for preserving food in a food compartment 12 in accordance with one embodiment of the invention. In the illustrated embodiment, food pan 14 is located inside the food compartment 12 to hold food items to be preserved. Food preservation system 10 further includes an ozone generator 16 to generate ozone and a moisture generator 18 to generate moisture in the food compartment 12. The system 10 also includes an ozone sensor 22 to sense ozone levels, a humidity sensor 24 to sense humidity levels, a residual gas sensor 26 to sense residual gas levels and a temperature sensor 28 to sense temperatures inside the food compartment 12. The system 10 further includes a controller 32 that controls or may otherwise influence operation of the food preservation system 10 to facilitate preservation of food items stored within food compartment 12.

In one embodiment, controller 32 dynamically controls levels of moisture, ozone, and residual gas in the food compartment 12 based at least in part upon the type of food stored therein. In another embodiment, the controller 32 may be responsive to the ozone sensor 22, the humidity sensor 24 and the residual gas sensor 26.

The system 10 may further include a circulating fan 42 to circulate ozone or moisture within the food compartment 12, and refreshing fan 44 to help reduce ozone, moisture or residual gases from the food compartment 12 if necessary. A damper 46 provides a controllable opening through which ozone, moisture, or residual gases may be vented out of the food compartment 12. Furthermore, the controller 32 may include a temperature control system (not shown) that controls the temperature inside said food compartment. In one embodiment of the invention, the temperature control system monitors and controls the temperature of a cold plate 52 that may be provided to cool the air and/or condense moisture in the food compartment 12. The cold plate 52 may be kept cold using a refrigeration system 54. Alternately, a thermoelectric device with reversible voltage may be used to cool or heat the food compartment 12 to maintain the desired temperature. In one embodiment, one or more of the circulating fan 42, the refreshing fan 44, the damper 46 and the refrigeration system 54 may be controlled by the controller 32.

The ozone generator 16 is adapted to generate ozone gas for provision to food compartment 12. In one embodiment, the ozone generator 16 generates ozone from atmospheric air. In another embodiment, the ozone generator 16 may generate ozone from oxygen supplied from an external source of oxygen. The ozone gas produced by the ozone generator 16 can be transferred in measured quantities through output ports and into the food compartment 12 so as to contact the surfaces of food items stored in the food compartment 12. In one embodiment, one or more ultraviolet lamps may be used by ozone generator 16 to generate the ozone.

In operation, the ozone generator 16 may utilize the photochemical reaction of oxygen under shortwave (185 nm) ultraviolet rays to produce a continuous flow of ozone. Generation of ozone and/or ultraviolet radiation can be used to retard and/or kill mold spores and other microbes that can render food stored within the food compartment 12 inedible, or at least undesirable. More specifically, ozone kills bacteria, clears away foul smells and keeps foods fresh by oxidizing and disintegrating glucose oxidase and dehydrogenation oxidase. In one embodiment, the controller 32 communicates with the ozone generator 16 to determine the intervals and quantity of ozone to be generated.

The ozone generator 16 of the system 10 may be embodied in several ways and is not limited to the above-described configuration. For example, in various embodiments of the invention, the ozone generator 16 may be a high voltage ozone ionizer. An ozone ionizer typically uses a first process to produce negative ions and another to produce ozone. Negative ions are electrically charged particles that attach themselves to airborne particulates through a process known as ionization. Ionization makes the particulates heavier than the surrounding air, causing them to drop and fall to the ground. Ozone on the other hand is a form of oxygen, which has been electrically energized, making it chemically more active than oxygen. Ozone, being a powerful oxidizing (or odor removing) agent, attaches to airborne pollutants, and through the process of oxidization, breaks down the molecular structure and neutralizes or destroys, the odor producing pollutant particles. In one embodiment, these two processes act in concert with one another to clean and purify the air inside the food compartment 12.

In one embodiment, the moisture generator 18 may be an evaporative steam humidifier designed to generate steam at atmospheric pressure for introduction into the food compartment 12. In one embodiment, the moisture generator 18 may maintain a small footprint area. Accordingly, it may be positioned inside the food compartment 12 such that it is accessible from the front or from the top of the food preservation system 10. The moisture generator 18 may include a user-refillable reservoir of liquid (such as water) that may be controllably released into the food compartment 12 via one or more outlet ports to vary internal humidity therein.

Embodiments of the invention are not limited to the above configuration of the moisture generator 18 and is not limited to the above-described configuration. For example, in various embodiments of the invention, the moisture generator 18 may be an ultrasonic nebulizer. An ultrasonic nebulizer typically converts electrical energy into mechanical vibrations to generate fine articles of water or steam, thereby producing a very fine mist of minute aerosol particles. This way, ultrasonic nebulizers are able to break steam or water particles into microscopic particles without the use of compressors and they can be housed within very small space such as the food compartment 12. In another embodiment of the invention, the moisture generator 18 may be a mechanical nebulizer. A mechanical nebulizer is typically powered by compressed air that produces a stable aerosol of water particles. In both of the above cases, an optional air-heating mechanism may be used to evaporate the micro-particles of water generated by ultrasonic or mechanical nebulizers. In one embodiment, the controller 32 communicates with the moisture generator 18 to determine intervals and quantity of moisture to be generated.

In one embodiment, the ozone sensor 22 senses the amount of ozone present in the air inside the food compartment 12 so that the level does not get too high. In the course of operation, when the ozone level reaches a determined level, the unit may be turned off. The generally accepted recommended levels of ozone for air purification are between 0.01 parts per million (ppm) and 0.05 ppm, while the human nose begins to detect the smell of ozone around 0.01 ppm. In one embodiment, an ozone meter (not shown) may be coupled to the ozone sensor 22 to display ozone levels on an easy to read multi colored bar graph for example. In one embodiment, the ozone sensor 22 may operate under the control of controller 32 to periodically sense of ozone levels inside the food compartment 12.

In one embodiment, the relative humidity sensor 24 monitors the relative humidity level of the food compartment 12, which may be a function of the humidity generated by the moisture generator 18 or by the natural moisture accumulated from the stored food items. In one embodiment, the relative humidity sensor 24 may include a thermoset polymer, three layer capacitance construction, platinum electrodes and on-chip silicon integrated voltage output signal conditioning. In one embodiment, the relative humidity sensor 24 may operate under the control of the controller 32 to sense relative humidity levels inside the food compartment 12.

Continuing to refer to FIG. 1, the residual gas sensor 26 monitors the level of residual gas(es) such as ethylene that may be present in the food compartment 12. Ethylene is a plant hormone that is released through the natural ripening process of the fruits and vegetables. Ethylene is used in the regulation of metabolic processes vital in both fruit ripening and leaf-abscission. In particular, ethylene has been found to induce, or be correlated with, the ripening of cantaloupe, apples and tomatoes. Ethylene levels have also been correlated with increasing plant respiration. Thus, in accordance with one embodiment of the invention, the amount of ethylene present in the food compartment 12 is monitored and controlled such that premature ripening of the fruits and the vegetables can be prevented or otherwise slowed.

Traditionally, gas chromatographic systems and photo acoustic detection systems have been used to measure ethylene levels. However such instruments are generally impractical for in-situ real-time measurements as the gas samples may be measured only after returning to a laboratory. In one embodiment, the measurement of ethylene within food compartment 12 may be made in-situ based on reversible conductivity change of a metallic element kept inside the food preservation system at an appropriate working temperature. In one instance, the ethylene sensing metallic element in the residual gas sensor 26 may be metal oxide films such as nano-porous $PtTiO_2$ films, the mass/elasticity of which respond to ethylene concentrations. In yet another embodiment of the invention, the residual gas sensor 26 is an odor sensor that displays the odor level or sends a signal representing the odor level in the food compartment 12 to the controller 32. In one embodiment, the residual gas sensor 26 communicates with the controller 32 to sense signals of residual gas or odor levels inside the food compartment 12.

Along with ozone, relative humidity and residual gases, another environmental parameter that may be closely monitored for effective preservation of food items in the food compartment 12 is the temperature inside the food compartment 12. The temperature sensor 28 is used to sense the temperature inside the food compartment 12. In one embodiment, the temperature sensor 28 is a thermistor that detects the temperature inside the food compartment 12 and provides feedback to the controller 32, which in turn controls the cooling system of the food preservation system 10. Typically, the operational range of the temperature sensor 28 is −30(° C.) to +105 (° C.). In one embodiment, the temperature sensor 28 includes an ammonia-resistant stainless steel sheet, a moisture-proof connection box, and a 4 to 20 mA transmitter. The transmitter may be epoxy-potted to protect its electronics from condensation damage and operates in ambient temperatures down to −13° F. (−25° C.). In one embodiment, the temperature sensor 28 communicates with the controller 32 to sense temperatures inside the food compartment 12.

Referring back to FIG. 1 once more, the controller 32 controls and coordinates the environmental management of the food preservation system 10. The controller 32 may represent hardware circuitry, software, or a combination thereof. More specifically, the controller 32 may thus include, but is not limited to a range of devices, such as a microprocessor based module, an application-specific or general purpose computer, programmable logic controller or a logical module, solid-state equipment, relays, etc., as well as appropriate programming code to performing computations associated with food preservation within the food compartment 12. In accordance with one embodiment of the invention, the controller 32 includes logic for activating the ozone generator 16 in coordination with sensing signals from the ozone sensor 22. This way, the controller 32 can monitor the ozone sensor 22 and at the same time, tracks the amount of ozone generated by the ozone generator 16 by using an ozone sensing methodology as described herein. The controller 32 may also include logic for activating moisture generator 18 in coordination with sensing signals received from the humidity sensor 24 to maintain the humidity level inside the food compartment 12 within an acceptable range. Similarly, the controller 32 may monitor the residual gas level inside the food compartment 12 via sensing signals received from the operation of the gas sensor 26 to detect if the residual gas level goes beyond an acceptable range for the food.

In another embodiment of the invention, the controller 32 further activates appropriate alerts if a determined level of ozone or moisture or residual gas(es) or temperature is exceeded. Similarly, the controller 32 may further activate appropriate alerts if a detected level of ozone, moisture, residual gas(es) or temperature falls below a determined or preset level. The command signals issued by the controller 32 may approximate a binary decision process wherein proper and improper levels or ranges depending on the type of food are differentiated. Alternatively, more robust information may be obtained and processed depending upon the type of situation being monitored, the sophistication of the sensor involved and logic of controller 32.

In operation, any one or more of the parameters such as relative humidity level, ozone level (e.g., expressed in parts per million), and residual gas level may be monitored and controlled by the adaptive controller 32. The controller 32 operates such that the system 10 remains within determined ranges of operation for the parameters suitable for the food selected for storage. The solid-state switches of the controller 32 help in that control. The solid-state switches may be embodied in several ways including optical, mechanical, electro-optic, and magneto-optic embodiments.

Referring to FIG. 1 again, in addition to the solid-state switches, there are interlock switches 34 and 36 that help prevent different emergency situations by stopping the ozone or moisture generating devices in time during any kind of failure. For instance, an interlock switch 34 associated with the ozone generator 16 interrupts the ozone generator 16 if the ozone sensor 22 fails. Similarly, an interlock switch 36 associated with the moisture generator 18 interrupts the moisture generator 18 when the relative humidity sensor 24 fails. Similarly, the temperature within the food compartment 12 may be continuously monitored by the controller 32 using temperature sensor 28 that is positioned in the food compartment 12. In case the temperature goes beyond a prescribed range necessary for food preservation (whether towards a higher or a lower side), suitable action of cooling or heating is taken to bring the temperature back to normal preferred region of operation. In another embodiment of the invention, there may be fiber optic based safety systems that directly replace mechanical safety interlock switches to safeguard potentially dangerous failures of the critical devices or sensors or other such events.

In operation, the interlock switches 34 and 36 interrupt operation of the controller 32 in time of a power failure and failure of any other kind. Interlock switches may include interlock logic circuitry (not shown) and an interlock timer (not shown) to synchronize the operation of the interlock logic circuitry in keeping with an internal clock. The Interlock switches uses discrete hardware to complement the controller 32, which takes care of a minimum required operation of the food preservation system 10 during any kind of failure. One such operation is stopping the ozone generator 16 or the moisture generator 18 during a failure. Embodiments of the invention are not limited to the above-described functionalities of the interlock electronics 152. There are many other operations such as activating audio and/or video warning indicators that can be performed by the interlock electronics during a failure of the food preservation system 10 or its components.

The adaptive control of the food preservation system 10 is achieved by monitoring and controlling the ozone generator 16 or the moisture generator 18 in coordination with the ozone sensor 22, relative humidity sensor 24, residual gas sensor 26 and temperature sensor 28. In one embodiment, the controller 32 may control various control cycles including a humidity cycle, an ozone cycle, and an air freshening cycle. The control cycles may be executed or performed sequentially or in parallel. The humidity control cycle that maintains humidity at a level best suitable for the food stored in the food compartment 12. The ozone control cycle that maintains ozone dosages at a level best suitable for the food stored in the food compartment 12. The air refreshing control cycle that maintains freshness of air in the food compartment 12 by reducing one or more of excess ozone, moisture and residual gases such as ethylene from the food compartment 12. Higher humidity maintains the freshness (by reducing water loss) and the ozone controls the microbial/fungal growth (visual quality & fungal/bacteria count). Maintaining a correct ozone level also facilitates removal of the unpleasant odors accumulated inside the food compartment.

In the ozone control cycle, the ozone may be generated in the food compartment 12 in a continuous mode to adaptively maintain the desired level of ozone in a continuous fashion. Alternately the ozone may be generated in a "dosage" form wherein the ozone source may be turned ON at a regular interval for a certain length of time until the desired ozone level is reached. The ozone dosage may be determined as a function of the dosage level and dosage frequency (number of dosage cycles per day). A typical ozone level setting may range from a Low (<0.05 ppm) to a High (>0.05 ppm), which may be selected automatically based on the type of food stored in the food compartment 12. In one embodiment, an air circulation fan 42 inside the food compartment 12 is switched ON while the ozone generator is ON to provide uniform distribution of ozone over the food items. The air circulation fan 42 may be represent two or more distinct devices or may represent a single device.

In a similar manner, the humidity inside the food compartment 12 may be maintained during the humidity cycle by humidification or dehumidification of the air inside the food compartment 12, depending e.g., upon a determined set-point and the actual humidity level in the food compartment 12. The humidification may be achieved by natural release of the moisture by the food stored in the food compartment 12. Alternately, the humidification may be achieved by running the moisture generator 18. There are different control parameters for different embodiments of the moisture generator 18 such as the evaporative steam generator, the ultrasonic nebulizer or the mechanical nebulizer. The dehumidification on the other hand may be obtained by a damper-fan mechanism, which vents the air from the compartment whenever the humidity exceeds the set point. Alternately the dehumidification may be obtained by using a cold plate 52 inside the food compartment 12. The cold surface of the cold plate 52 condenses, collects and eventually removes excess humidity from the food compartment 12. The cold plate 52 may be cooled using a refrigeration system 54 or using other solid-state devices such as a thermoelectric chip.

In a similar manner, during the air refreshing control cycle the residual gases may be reduced from the food compartment 12 in a continuous mode to maintain the desired level of residual gases continuously. In one instance, the air-refreshing cycle refreshes the compartment air through cyclic operation of the damper 46 and the refreshing fan 44. Controller 32 may include timing mechanisms that activate time-based controls of the ozone generator 16 and/or moisture generator 18. These controls in turn trigger local control electronics of the ozone generator 16 and/or moisture generator 18. The refreshing action vents out excess ozone or moisture or residual gases such as ethylene produced by the food stored in the food compartment. The refreshing action in one instance may happen just before every ozone dosage cycle or in another instance before alternate ozone cycles. In yet another instance, the refreshing action may happen at a cycle time equal to multiple of ozone cycle time. The refreshing time may vary depending upon the food load, humidity requirements and residual gases present in the compartment.

In operation, as part of all the control cycles, suitable time based interlock 34 is added into control circuit of ozone generator 16 to interrupt the ozone generation after a preset time in case the ozone sensing fails. Similarly suitable time based interlock 36 is added into control circuit of moisture generator 18 to interrupt the moisture generation after a preset time in case the humidity sensing fails. As described earlier, the adaptive controller 32, in this embodiment of the invention, with the help of all the sensors, the optical switches and the interlock switches, determines, interprets and controls the status of the food preservation system 10 based on the output signals of the ozone sensor 22, relative humidity sensor 24, residual gas sensor 26 and temperature sensor 28.

Figure 2:
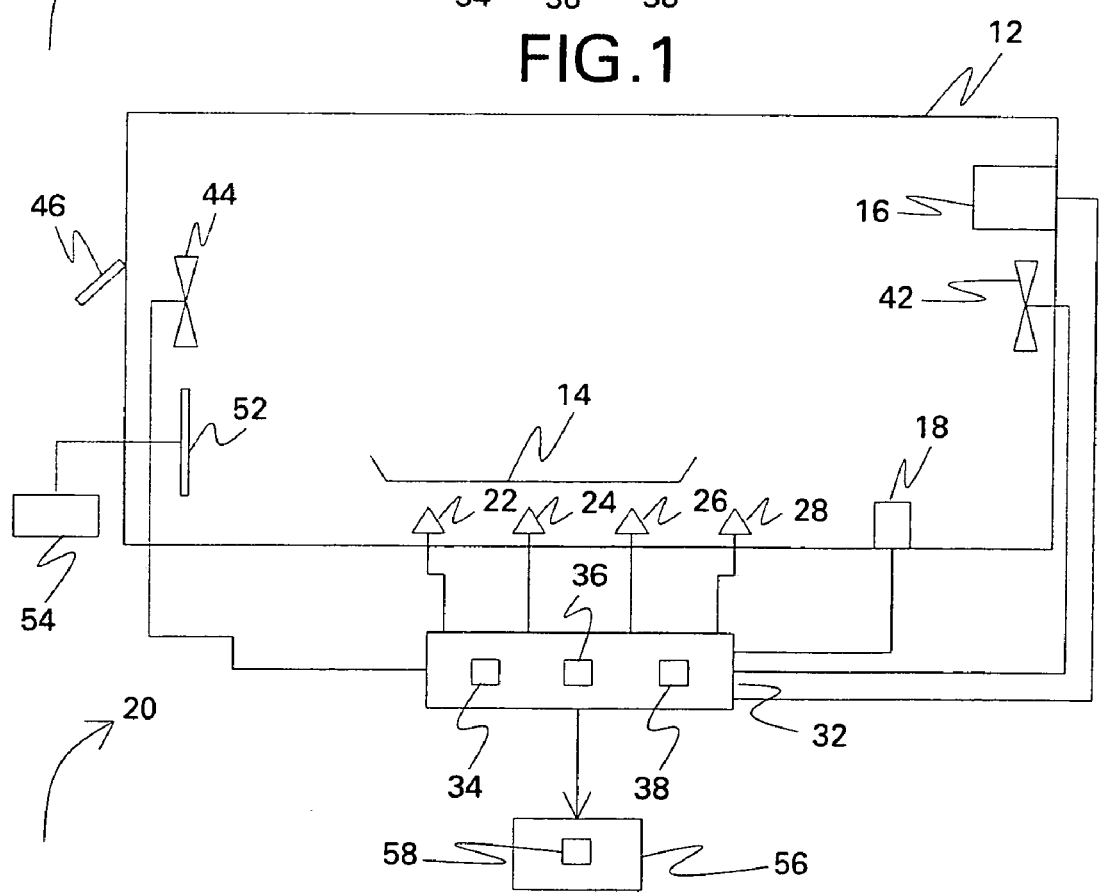
FIG. 2 is a block diagram of a food preservation system constructed in accordance with a second exemplary embodiment of the invention.

Embodiments of the invention are not limited to the above-described configuration of the system 10 that includes a controller 32. FIG. 2 is a simplified schematic diagram of an exemplary system 20 for preservation of food in a food compartment 12 in accordance with a second embodiment of the invention. The system 20 is enhanced by the addition of a user interface 56. The user interface 56 is electrically coupled to the controller 32 and it can be used in conjunction with the controller 32 operating in a user-input mode where it polls for input. The input includes various user driven selections such as of the type of food to be stored in the food compartment. There is a selection switch 58 in the user interface 56 for this purpose. Other than the user interface 56 and the selection switch 58, the system 20 is substantially similar to system 10 shown in FIG. 1. Components in system 20 that are identical to components of system 10 are identified in FIG. 2 using the same reference numerals used in FIG. 1.

Referring to FIG. 2, the user interface 56 is located at a control unit near the food preservation system 20 to receive inputs directly from a user. Positioning the user interface 56 can be embodied in different ways. In one embodiment of the invention, the user interface 56 is included in the controller 32 and the controller 32 along with the user interface 56 are positioned on the food compartment 12. In another embodiment of the invention, the user interface 56 is positioned proximate to the refrigerator unit and the controller 32 may be positioned at a location remote from the food preservation system 10. In yet another embodiment, the user interface 56 may be provided on the food compartment 12 on to the refrigerator main control board the food preservation system is part of. The controller 32 senses the user input about the food preservation environmental zone or the food type and adapts the food preservation system 10 to a particular type of food or a particular combination of environmental parameters for preservation of food inside the food compartment 12, the controller 32 maintains the system at that state. If the ozone, moisture and residual gas level are sensed to go beyond predetermined acceptable limits for the selection made, the controller 32 sends appropriate signals to generate or reduce ozone or moisture or residual gases. In another instance, the controller 22 processes the information coming from the sensors and sends a signal to an alerting system 24 or to a remote location as explained earlier.

In addition to providing input concerning the environmental conditions or type of food to be stored in the food compartment 12, the user may also command certain operations that an operator normally attends to in a manual mode of operation. For example, the operator may periodically release additional ozone or moisture into the food compartment 12. Moreover, in another instance, if on opening the compartment the user smells an odor, the user can use the user interface 56 to command the controller 32 to cause release of additional ozone or moisture or a refreshing cycle. The algorithms stored in the controller 32 are adaptive and the controller 32 learns from various such user inputs, such that venting will occur more frequently, or more ozone or moisture will be generated or released as the case may demand.

Thus, in this embodiment of the invention, a user provides a number of inputs via the user interface 56 for the controller 32 to controls the internal environment of food compartment 12. This way, the controller unit 32 permits a user to customize the internal environment of compartment 12, as a function of the food stored in the food compartment 12. Typically, the user interface 56 includes one or more selection switch(es) 58 or similar controls that a user can push or touch or perhaps remotely control to input certain information to the controller 32. In another instance, the user interface 56 further includes a display (not shown), such as a liquid crystal display (LCD), that can be used to prompt the user for input data, and to visually confirm to the user that the desired user input has indeed been input correctly.

Figure 3:
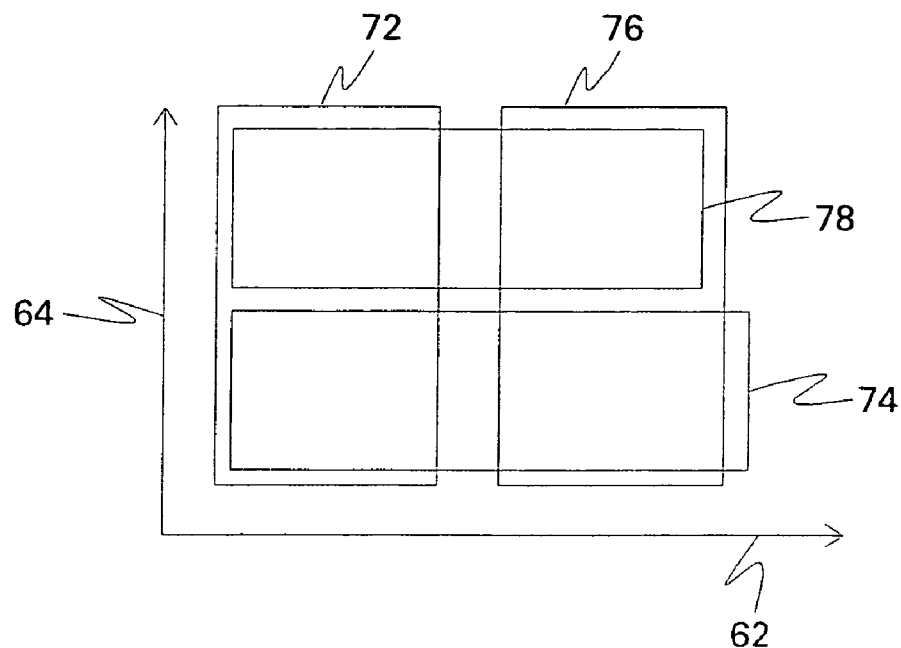
FIG. 3 is a block diagram illustrating four typical food preservation environmental zones depending on varying conditions of relative humidity and ozone.

In one embodiment of the invention, the user input relates to food preservation environmental zones. Once selected, the controller 32 maintains the environment in that state. FIG. 3 is a block diagram illustrating four typical food preservation environmental zones, referred to as 'food zones' hereafter, depending on varying conditions of ozone, relative humidity and residual gas inside the food compartment 12. The horizontal axis 62 is an ozone axis, which from left to right represents an increasing quantity of ozone in the food compartment 12. Similarly the vertical axis 64 is a relative humidity axis, which from bottom to top represents an increasing quantity of relative humidity in the food compartment 12. As illustrated, there are at least four food zones defined by the two axes. For instance, zone 72 represents a low ozone zone. Foods stored in the food compartment 12 operating under this condition are likely to have relatively low pitting/browning problems. Similarly, zone 74 is a low relative humidity zone. Foods stored in the food compartment 12 operating under this condition are likely to have relatively low fungal growth. In the same manner, zone 76 represents a high ozone zone. Foods stored in the food compartment 12 operating under this condition are likely to have relatively high bacteria, fungal and odor control. Again, zone 78 is a high relative humidity zone and foods stored in the food compartment 12 operating under this condition are likely to have relatively low water loss.

Some food items typically are better preserved at higher relative humidity because of reduced water loss. Some other food items may remain in better condition at a relatively lower humidity because of reduced fungal growth. Yet other food items may remain fresh at higher ozone dosages because of better fungal/microbial control. There are still other food items that may be better preserved at lower ozone dosages because of reduced surface pitting/browning. In one embodiment, the food preservation system 20 is able to preserve any food at a set point among the four combinations of humidity and ozone maintained in the food compartment 12. The feature of food zone selection is part of an adaptive environmental control strategy that maintains food freshness in the food compartment 12 through microbial control and water loss management.

The concept of food zone selection is based upon selective control of relative humidity and ozone dosage inside the controlled compartment. In one embodiment, the user may select or indicate a "food zone" such as 72 or 74 or 76 or 78 as suitable for the particular food being stored in the food compartment 12. Based upon the selection, the food preservation system 20 automatically sets the appropriate ozone dosage level, ozone dosage cycle, relative humidity etc. Since the food compartment 12 is typically a closed compartment having airtight seals, the controller 32 may then maintain the suitable humidity level with the aid of the humidity sensor 24, ozone dosage with the aid of the ozone sensor 22 and air refreshing with the aid of the residual gas sensor 26. In the same manner, residual gas levels may be maintained at an acceptable level by activating air refreshing control cycles to periodically to vent the air, moisture or ozone from inside the food compartment 12. This may involve operation of the damper 46 and either or both the circulating fan 42 and the refreshing fan 44 at appropriate refreshing frequency and duration. As illustrated earlier, the refreshing may happen just before every ozone dosage cycle or at a cycle time equal to a higher multiple of ozone cycle time. Alternately the venting may be activated based upon the sensing of the common gases such as ethylene produced by food. The refreshing ON time again may vary depending upon the food load, humidity requirements and residual gases present.

Figure 4:
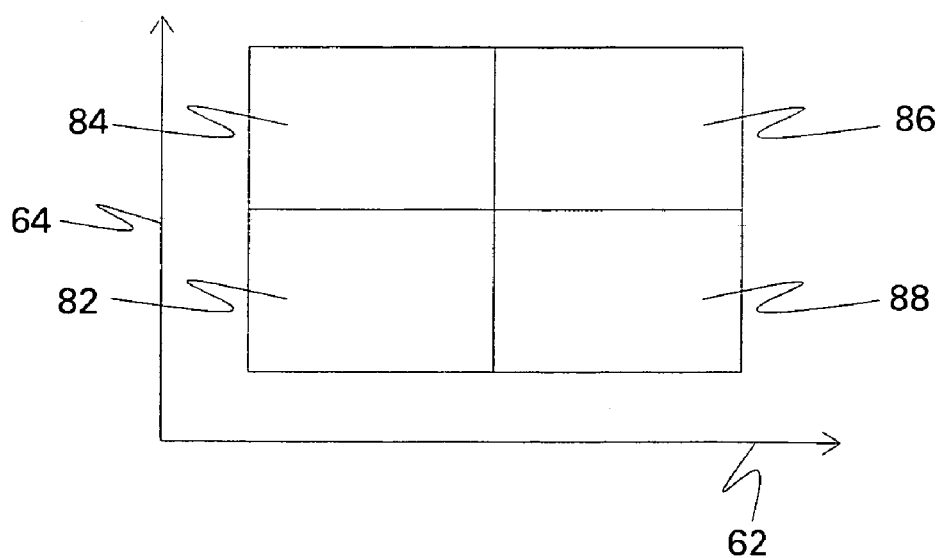
FIG. 4 is a block diagram illustrating four typical food types that need varying conditions of relative humidity and ozone for preservation in the food preservation system of FIG. 1 and FIG. 2.

In yet another embodiment of the invention, a user may not know the suitable combination of environmental parameters for preservation of a particular type of food inside the food compartment 12. In such a case, the user can indicate his option by selecting an appropriate "food type" for preservation. FIG. 4 is a block diagram illustrating four typical food types that need varying conditions of relative humidity and ozone for preservation in the food preservation system of FIG. 1 and FIG. 2. The horizontal axis 62 is an ozone axis and from left to right, it represents an increasing quantity of ozone in the food compartment 12. Similarly the vertical axis 64 is a relative humidity axis and from bottom to top, it represents an increasing quantity of relative humidity in the food compartment 12. There are four operating zones for four types of food. These four zones are formed by high and low operating conditions of each of the two axes. Typically 'low' humidity level signifies relative humidity varying over a range of 85% to 95% and 'high' humidity level signifies relative humidity above 95%. In a like manner, 'low' ozone level signifies ozone volume varying over a range of 0 ppm to 0.05 ppm and 'high' ozone level typically signifies ozone volume varying over a range of 0.05 to 0.1 ppm. For instance, zone 82 is a default operating zone and it represents a low ozone, low relative humidity zone. Default settings suitable for this default zone sets the humidity level at low and ozone level at low, a safe set point. Normal foods such as fresh fruits and vegetables are best preserved in this operating zone. Similarly, zone 84 is a low ozone, high relative humidity operating zone. Type A foods such as cabbage, lettuce, beans and other leafy vegetables are best preserved in this operating zone. In the same manner, zone 86 represents a high ozone, high relative humidity zone. Type B foods such as cheese, milk products and non-respiration foods are best preserved in this operating zone. Again, zone 88 is a high ozone, low relative humidity zone. Type C foods such as strawberry and other highly perishable foods are best preserved in this operating zone.

In operation, by way of example, the food compartment 12 may store some fruits and vegetables that will be held for a period of days or weeks. User interface 56 would permit the user to input the type and quantity of food and that data be provided to the controller 32 to control the environment of food compartment 12 in a manner best suited for the type and quantity of food. In the example situation as illustrated in FIG. 4, the user may press the types "Default" or "A" or "B" or "C" to indicate the type of food he wants to store. The memory associated with controller 32 may include an algorithm, that when executed by the microprocessor of the controller 32, prompts the user on a display and/or with an audible prompt signal to now input food quantity as e.g., indicated by the number of items or weight in kilograms or pounds. Alternatively, the system could automatically determine the quantity of food or not require food quantity information. The microprocessor could then determine what combination of environmental conditions such as ozone level, humidity level, residual gas level or temperature within food compartment 12 is conducive to preserve the input type and quantity of food. The controller 32 is provided with this information and it monitors, controls and maintains the environment inside the food compartment accordingly using e.g. the ozone generator 16, moisture generator 18, the circulating fan 42 or the refreshing fan 44 in coordination with the ozone sensor 22, relative humidity sensor 24, residual gas sensor 26 or the temperature sensor 28. For instance, if the relative humidity level needs to be increased, the controller 32 may cause the moisture generator 18 to generate more moisture into the food compartment 12. In another instance, if ozone level needs to be reduced, the controller 32 will cause the refreshing fan 44 to reduce some ozone from the food compartment 12. In the example given here, other possible user-input data may include anticipated length of storage of the food such as in hours, weeks or months.

Embodiments of the present invention utilizing modular food compartment 12 in food preservation systems 10 and 20 have been described. The invention however is useful in other alternative configurations as well. For example, in another embodiment of the invention, the modular food compartment 12 may be integrated with a refrigerator fresh-food compartment. Alternately, in yet another embodiment of the invention, the food compartment 12 may be a stand-alone product with or without an external cooling mechanism. Further, in yet another embodiment of the invention, the food preservation systems 10 or 20 may be a front-open system or a top-open system. In yet another embodiment of the invention, the food compartment 12 may be a section of a refrigerator compartment or may be the entire compartment itself.

Figure 5:
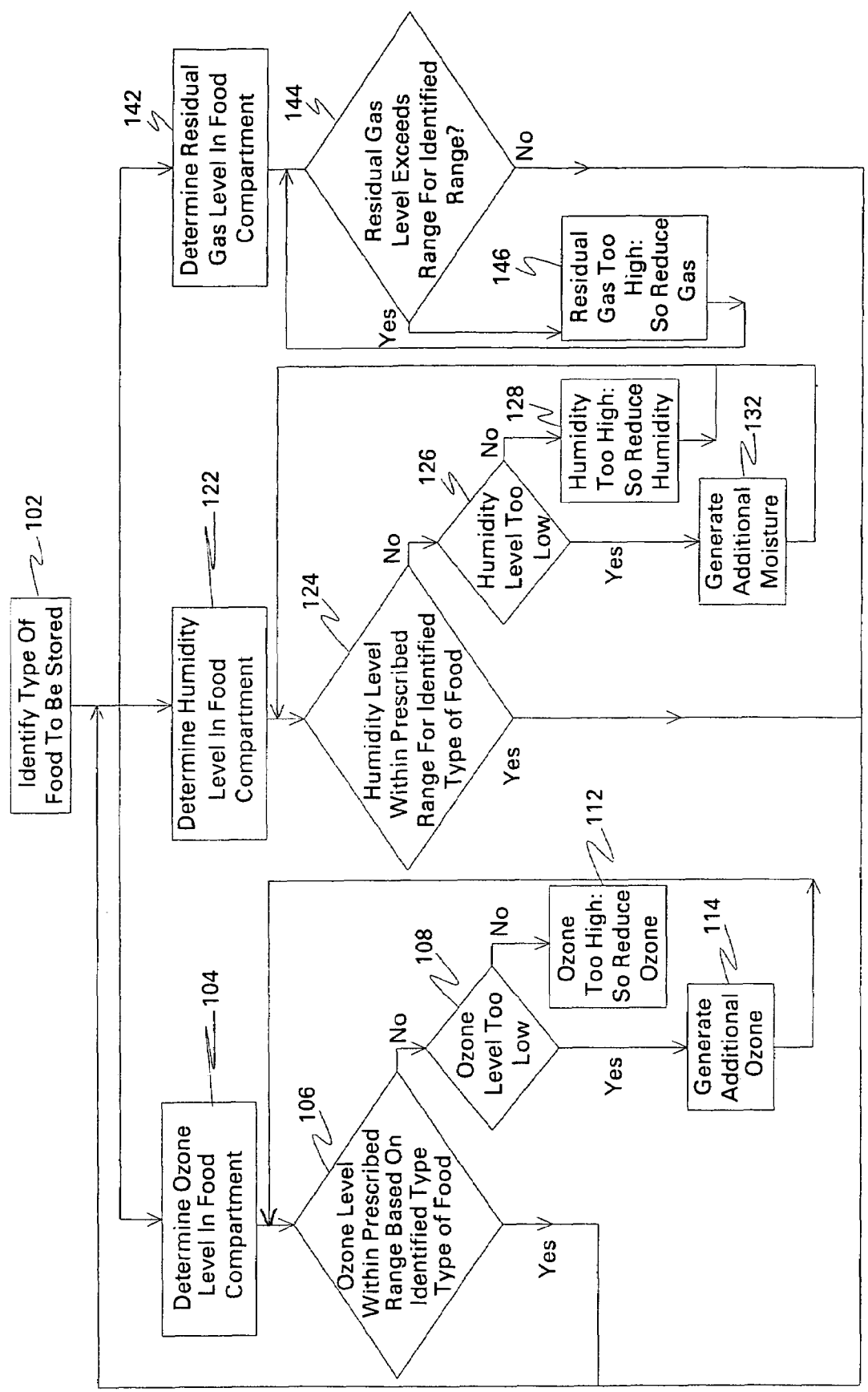
FIG. 5 illustrates a method for food preservation in accordance with an exemplary embodiment of the invention.

FIG. 5 illustrates an exemplary method 100 for preserving food in a food compartment in accordance with one embodiment of the invention. To this end, beginning at block 102, a type of food to be stored is identified. In one embodiment the food is identified manually via user input. In other embodiments, the food preservation system may automatically determine the type of food stored. At block 104, the ozone level in the food compartment is determined. On one embodiment, the ozone sensor 22 is positioned in the food compartment 12 to sense the amount of ozone in the food compartment. At block 106, a determination is made as to whether the ozone level falls within a prescribed range based on identified type of food.

The prescribed range of ozone level may include minimum and maximum values. In another instance, instead of a range, one or more independent values may be stipulated. For example, a single value representing only a minimum ozone level or a value representing only a maximum ozone level may be provided. Alternatively, a string of values may also be provided indicating, for instance, various levels of action to be taken. For example, one value representing an ozone level may be provided, which when reached, indicates that the system should stop producing ozone. Another ozone level could be provided in which the system vents the compartment once reached. Normally if the ozone level is found to be within the prescribed range, the operation continues. However, if the ozone level is determined to be outside the prescribed range, another decision situation arises at block 108. At block 108, the system determines whether the ozone level is too low. If ozone level is determined to be too low, additional ozone is generated at block 114 using an ozone generator to restore the ozone level within the prescribed range. On the other hand, if ozone level is determined to be too high as at block 112, some amount of ozone is reduced until the ozone level is restored to be within the prescribed range.

Similar decision logic is followed to keep the humidity level in the food compartment at an appropriate level as determined e.g. on the type of food stored in the food compartment. At block 122, the humidity level in the food compartment is determined. In one embodiment, the humidity sensor 24 positioned in the food compartment 12 senses the relative humidity in the food compartment. At block 124, a determination is made as to whether the humidity level falls within a prescribed range based on identified type of food. The prescribed range of humidity level may be embodied in various ways as illustrated above in relation to the prescribed range of ozone level. Normally, if the humidity level is found to be within the prescribed range, the operation continues. Otherwise, if the humidity level is determined to be outside the prescribed range, a determination is made as to whether the humidity level is too low. If humidity level is determined to be too low, additional moisture is generated at block 132 using e.g. the moisture generator 18 to restore the humidity level within the prescribed range. On the other hand, if humidity level is determined to be too high as at block 128, some amount of moisture is reduced until the humidity level is restored to be within the prescribed range.

Yet another similar decision logic is followed to keep the levels of residual gases such as ethylene in the food compartment within control. At block 142, the level of residual gases in the food compartment 12 is determined. In one embodiment, residual gas sensor 26 is positioned in the food compartment 12 to sense the level of residual gas(es) in the food compartment. At block 144, a determination is made as to whether the level of residual gas(es) exceeds a prescribed range based on identified type of food. The prescribed range of residual gases level may be embodied in various ways as illustrated above in relation to the prescribed range of ozone and humidity level. Normally, the level of residual gases is found to be within the prescribed range, the operation continues normally. Otherwise, if the level of residual gases is determined to be too high as at block 146, some amount of residual gases is reduced until the level of residual gases is restored to be within the prescribed range. In one embodiment, reduction of the residual gases may occur by venting residual gases out through damper 46.

In essence, the method 100 receives an input from a user though a user interface and then adapts to the level of ozone, humidity or residual gases in the food compartment continuously depending on the type of food to preserve the food and maintain the freshness.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A food preservation system, comprising:
   a food compartment to store food;
   a humidity sensor to sense a humidity level inside said food compartment;
   an ozone generator to generate ozone gas inside said food compartment;
   an ozone sensor to sense an ozone level inside said food compartment;
   a gas sensor to sense a level of residual gas inside said food compartment; and
   a controller that operates to preserve the food stored in said food compartment as a function of at least a type of said food stored in said compartment, wherein said controller further comprises an interlock to interrupt said ozone generator when said ozone sensor fails.

2. The system according to claim 1, wherein said ozone generator comprises an ultraviolet lamp.

3. The system according to claim 1, wherein said ozone generator comprises a high voltage ionizer.

4. The system according to claim 1, wherein said food compartment further comprises an air circulation fan configured to circulate said ozone in said food compartment.

5. The system according to claim 1, wherein said gas sensor comprises an odor sensor configured to sense an odor inside said food compartment.

6. The system according to claim 1, further comprising a moisture generator externally coupled to said food compartment to generate moisture inside said food compartment responsive to said controller.

7. The system according to claim 6, wherein said moisture generator comprises at least one selected from the group consisting of an evaporative steam generator, a mechanical nebulizer, an ultrasonic nebulizer, and combinations thereof.

8. The system according to claim 1, further comprising a cold plate positioned in said food compartment to cool air in the food compartment.

9. The system according to claim 1, wherein said residual gases comprise ethylene.

10. The system according to claim 1, further comprising a user interface configured to receive user input to be used by said controller to determine the type of food stored in said food compartment.

11. The system according to claim 1, wherein said controller comprises a temperature control system configured to control temperature inside said food compartment.

12. A food preservation system, comprising:
a food compartment to store food;
a humidity sensor to sense a humidity level inside said food compartment;
a moisture generator;
an ozone generator to generate ozone gas inside said food compartment;
an ozone sensor to sense an ozone level inside said food compartment;
a gas sensor to sense a level of residual gas inside said food compartment; and
a controller that operates to preserve the food stored in said food compartment as a function of at least a type of said food stored in said compartment, wherein said controller further comprises an interlock to interrupt said moisture generator when said humidity sensor fails.

13. A refrigerator comprising:
a food compartment to store food;
a user interface configured to receive user input relating to the type of the food stored in said food compartment;
a humidity sensor configured to sense a humidity level inside said food compartment;
an ozone generator configured to generate ozone gas inside said food compartment;
an ozone sensor configured to sense an ozone level inside said food compartment;
a gas sensor configured to sense a level of residual gas inside said food compartment; and
a controller, responsive to said user interface, humidity sensor, ozone sensor and gas sensor, that controls the levels of moisture, ozone and residual gas in said food compartment as a function of the type of food stored in said compartment to facilitate preservation of the food, wherein said controller further comprises an interlock to interrupt said ozone generator when said ozone sensor fails.

14. A refrigerator comprising:
a food compartment to store food;
a user interface configured to receive user input relating to the type of the food stored in said food compartment;
a humidity sensor configured to sense a humidity level inside said food compartment;
an ozone generator configured to generate ozone gas inside said food compartment;
an ozone sensor configured to sense an ozone level inside said food compartment;
a gas sensor configured to sense a level of residual gas inside said food compartment;
an external moisture generator configured to generate moisture inside said food compartment; and
a controller, responsive to said user interface, humidity sensor, ozone sensor and gas sensor, that controls the levels of moisture, ozone and residual gas in said food compartment as a function of the type of food stored in said compartment to facilitate preservation of the food, wherein said controller further comprises an interlock to interrupt said moisture generator when said humidity sensor fails.

15. A method for preserving food in a food compartment, comprising:
determining a humidity level inside said food compartment; determining an ozone level inside said food compartment;
determining a level of residual gases inside said food compartment; and
adaptively controlling the levels of humidity, ozone and residual gas in said food compartment as a function of a type of said food stored in said compartment to facilitate preservation of said food,
wherein said controlling comprises venting residual gases out of said food compartment for a determined duration.

16. The method according to claim 15, wherein said controlling comprises maintaining a target humidity level in said food compartment based at least in part upon the type of food stored.

17. The method according to claim 16, wherein controlling comprises generating moisture inside said food compartment when the humidity level is below said target humidity level based at least in part upon said type of food.

18. The method according to claim 16, wherein said maintaining further comprises humidifying or dehumidifying air in said food compartment based at least in part upon said determined humidity level and said target humidity level.

19. The method according to claim 18, wherein said dehumidifying comprises venting air out of said food compartment.

20. The method according to claim 18, wherein said dehumidifying comprises cooling air in said food compartment.

21. The method according to claim 15, wherein said controlling comprises controlling a supply of ozone to said food compartment to maintain a determined ozone level in said food compartment based at least in part upon the type of food.

22. The method according to claim 15, wherein said controlling comprises providing ozone to said food compartment in a continuous mode until a target ozone level is reached.

23. The method according to claim 15, wherein said controlling comprises providing ozone to said food compartment in a predetermined quantity at a predetermined interval to maintain a determined ozone level in said food compartment.

* * * * *